United States Patent [15] 3,673,319

Humphrey [45] June 27, 1972

[54] VIDEO COMPENSATION CIRCUIT FOR EMPHASIZED-CARRIER DETECTOR

[72] Inventor: John G. Humphrey, Chesapeake, Va.

[73] Assignee: General Electric Company

[22] Filed: March 3, 1971

[21] Appl. No.: 120,464

[52] U.S. Cl. ....................178/5.4 R, 178/5.8 R

[51] Int. Cl. ....................H04n 9/12

[58] Field of Search ....................178/5.4, 5.8

[56] References Cited

UNITED STATES PATENTS 2,989,581 6/1961 Keizer et al. ....................178/5.4 R

*Primary Examiner*—Richard Murray
*Attorney*—James E. Espe, Francis H. Boos, Jr., Frank L. Neuhauser, Oscar B. Waddell and Joseph B. Forman

[57] ABSTRACT

An emphasized-carrier system for a television receiver which allows luminance, chrominance and sound signals to be detected in a common stage. The amplitude of the picture carrier frequency of an IF signal is increased with respect to the other frequencies thereof, and the resulting distorted signal is applied to a first detector device. The incremental change in the IF signal is abstracted and applied to a second detector device. The signals outputted by the two detectors are then subtracted in a differential amplifier to produce an undistorted detected signal.

11 Claims, 2 Drawing Figures

Patented June 27, 1972 3,673,319

2 Sheets-Sheet 1

INVENTOR
JOHN G. HUMPHREY
BY James E. Espe
HIS ATTORNEY

INVENTOR
JOHN G. HUMPHREY
BY James E. Espe
HIS ATTORNEY

VIDEO COMPENSATION CIRCUIT FOR EMPHASIZED-CARRIER DETECTOR

BACKGROUND OF THE INVENTION

The present invention relates to television receivers, and, more particularly, to emphasized-carrier systems in which luminance, chrominance and sound signals may be detected in a common network.

In most present-day television receivers, a pair of detectors are presented to the signal path subsequent to intermediate-frequency (IF) amplification. One detector derives luminance and chrominance information from an IF signal, while the other derives sound information from the IF signal. A trap before the luminance-chrominance detector serves to prevent the 41.25 MHz sound carrier from being transmitted therethrough and causing distortions in the resulting luminance and chrominance signals.

It has been proposed in U.S. Pat. No. application Ser. No. 112,136 R.B. Dome filed Feb. 3, 1971, and assigned to the assignee of the present invention, that a single IF detector system which obviates the spurious interference resulting from the presence of the 41.25 MHz sound carrier may be facilitated by emphasizing selected portions of the IF signal. In particular, Dome teaches that by raising the amplitude of the 45.75 MHz picture carrier relative to other portions of the IF band the 41.25 MHz sound carrier may be presented to a detector along with the video signals, without the creation of spurious interference of an unacceptable magnitude. In order to accomplish this, a resonant circuit tuned to the picture carrier frequency is coupled to the output of a final IF amplifier for attenuating all portions of the IF signal relative to the picture carrier. After detection, a compensating video amplifier network is provided to return the detected signal to the proper form. The detected signal thus developed contains the proper proportions of luminance, chrominance, and sound information and may be applied directly to luminance, chrominance and sound amplification circuits. While the system so far described eliminates the need for a separate sound detector, and does away with the need for the relatively expensive 41.25 MHz trap, it requires a compensating video amplifier network having precisely-defined characteristics. Further, the fine tuning of the receiver, as reflected in the IF signal, must be adjusted to place the picture carrier almost exactly at the central frequency of the resonant circuit which is used to supply carrier emphasis.

It will therefore be appreciated that it would be desirable to provide a detection system incorporating the advantages of the emphasized carrier scheme taught by Dome without requiring a precisely tuned IF signal, and without the need for placing stringent requirements upon the characteristics of the compensating circuitry.

It is therefore an object of the present invention to provide an emphasized-carrier detection system which does not require compensation circuitry having characteristics which must be controlled within very close limits.

It is a further object of the present invention to provide a television receiver detection system which does not require a 41.25 MHz trap.

SUMMARY OF THE INVENTION

Briefly stated, in accordance with one aspect of the present invention the foregoing objects are achieved by providing resonant circuit means tuned to a central frequency which is substantially the same as the picture carrier portion of an IF signal. The resonant circuit is resistively coupled to the output of a final IF amplifier and operates to increase the amplitude of the picture carrier frequency with respect to the other frequencies comprising the IF signal. A first detector receives the emphasized-carrier IF signal and outputs a detected signal which, while containing negligible amounts of spurious interference, manifests the distortion effected by the carrier emphasis. A second detector is coupled to the other side of the resistive means and thus receives an input representing the signal appearing across the resonant circuit. The signal appearing across the resistive means represents the unemphasized IF signal so that the second detector produces an output representing only the distorted portion of the IF signal. A differential amplifier receives the outputs of the first and second detectors and effectively subtracts them, outputting a signal comprising the detected portion of an undistorted IF signal. The differential amplifier output is then applied to luminance, chrominance, and sound circuits.

BRIEF DESCRIPTION OF THE DRAWINGS

While the specification concludes with claims particularly pointing and distinctly claiming the subject matter which is regarded as the invention, it is believed that the invention will be better understood from the following description of the preferred embodiment, taken in conjunction with the accompanying drawings in which:

DESCRIPTION OF THE PREFERRED EMBODIMENT

Figure 1:
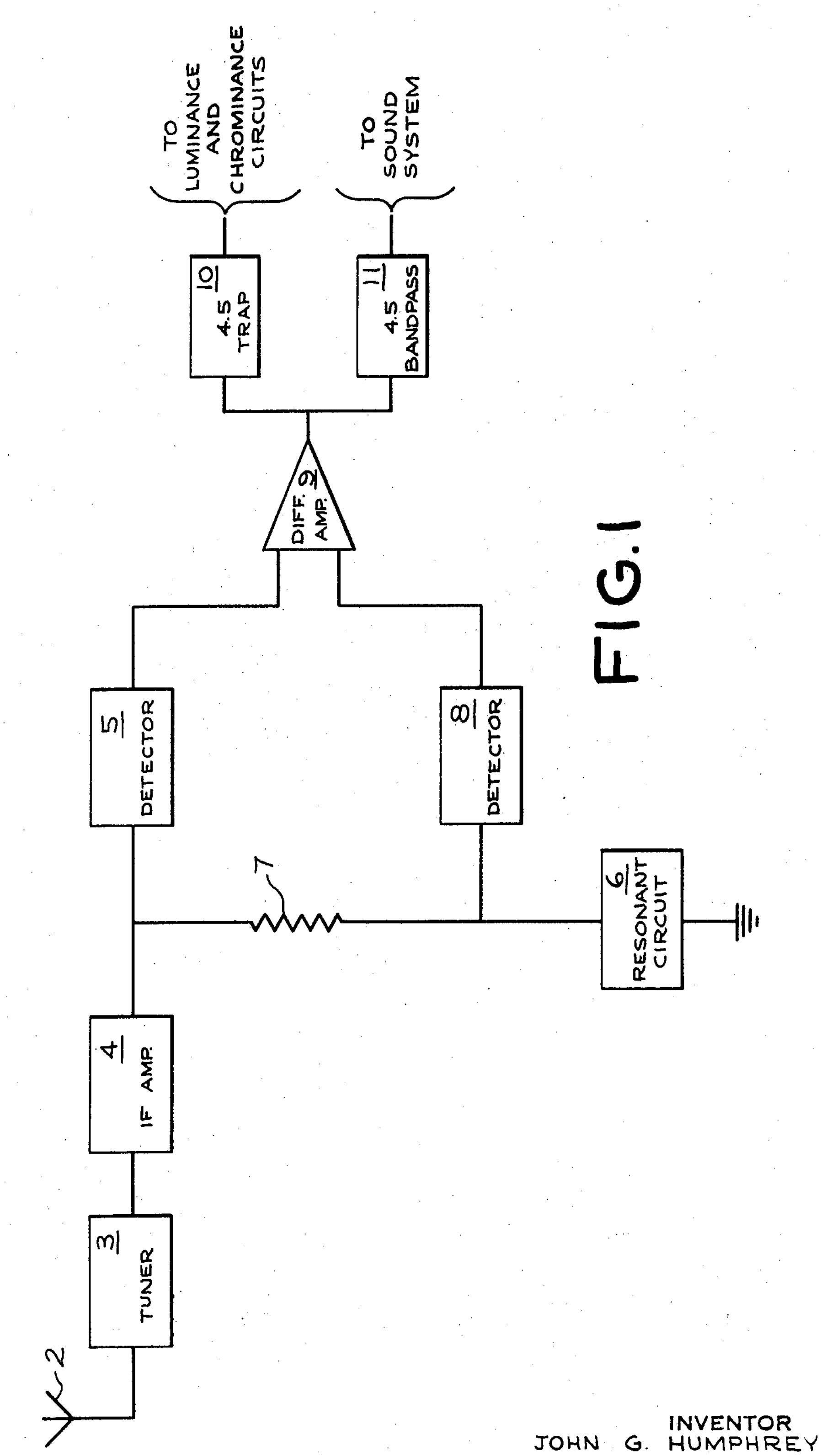
FIG. 1 is an idealized diagram of selected portions of a television receiver embodying the present invention.

Referring now to FIG. 1, RF signals detected by an antenna 2 are transmitted to a tuner 3 of any suitable type. The tuner outputs an IF signal which is amplified by an IF amplifier 4 comprising one or more amplification stages. The output of amplifier 4 is then applied to the input terminal of a first detector 5. A resonant circuit 6 is coupled by means of dropping resistor 7 to the input of detector 5 for attenuating predetermined portions of the IF signal applied to the detector. A second detector 8 is coupled directly to resonant circuit 6 and receives a signal which is similar to the unattenuated portion of the IF signal. It should be pointed out that the term "first detector" and "second detector " are used herein to indicate the devices represented in the Figures, rather than as generic terms indicative of detectors positioned after RF and IF amplification stages, respectively.

The signals derived by detectors 5 and 8 are applied to a differential amplifier 9, the output of which represents the signal appearing across resistor 7 after detection. Differential amplifier 9 thus serves to subtract out the effect of the distortion of the IF signal introduced by resonant circuit 6, leaving intact that which represents the detected product of an undistorted IF signal.

It will be seen that no trap has been provided to prevent the introduction into the detectors of the 41.25 MHz sound carrier. A sound signal is therefore present in the detected signal and may be abstracted from the signal outputted by differential amplifier 9. In order to aid in the separation of various frequencies comprising the detected signal, it has been found desirable to couple a 4.5 MHz trap 10 to the output of the differential amplifier for providing signals to the luminance and chrominance channels, and a 4.5 MHz bandpass filter 11 to the output of amplifier 9 for providing a filtered intercarrier sound signal to the audio stages of the television receiver.

Figure 2:
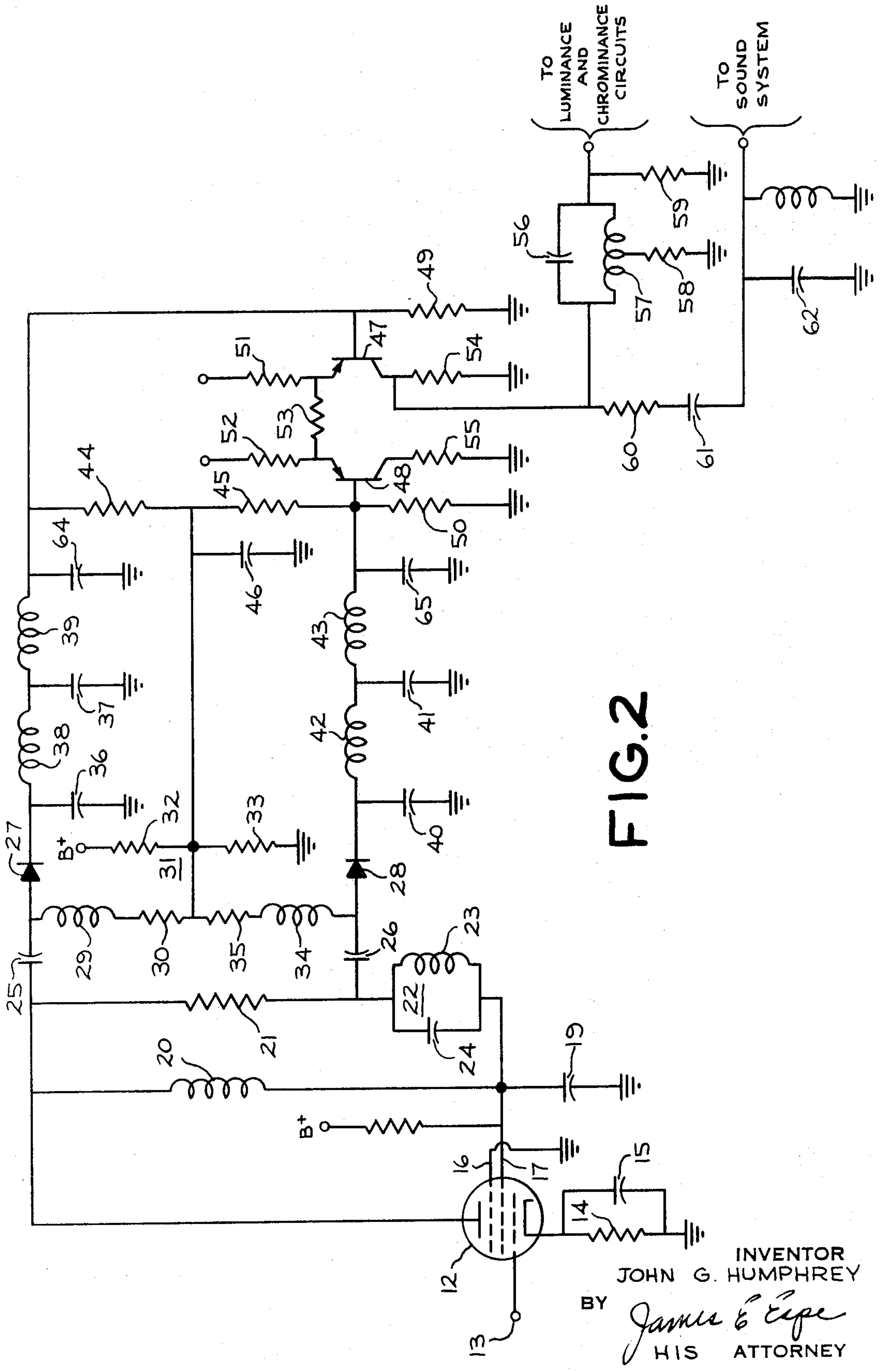
FIG. 2 is a schematic diagram showing elements constituting a preferred embodiment of the present invention.

Turning now to FIG. 2, a preferred embodiment of a circuit utilizing the present invention is shown in detail. A vacuum tube 12 which comprises a final IF amplifier stage receives an IF signal at its control grid terminal 13. The cathode of tube 12 is connected to ground through suitable biasing means including resistor 14 and capacitor 15. The suppressor grid 16 is connected directly to ground, while the screen grid 17 is coupled to a source of positive biasing potential by means of resistor 18. A capacitor 19 is connected between screen grid 17 and ground so as to present a point of essentially ground potential to IF signals. Inductor 20 is connected between the plate and the screen grid of tube 12 and cooperates with the output capacitance of the tube to form a resonant circuit which presents a relatively high output impedance to subsequent circuitry. The high output impedance thus achieved lends the tube some of the characteristics of a constant-current source. A dropping resistor 21 serves to couple one end of a resonant circuit 22, constituted by the parallel combination of an inductor 23 and a capacitor 24, to the plate of tube 12. As taught in the above-mentioned Dome application Ser. No. 112,136, in the presence of a high output impedance signal source the value of resistor 21 should be approximately 0.07 that of the impedance of circuit 22 at resonance. The end of the resonant circuit opposite resistor 21 is coupled to capacitor 19 providing a path to ground for IF signals not blocked by resonant circuit 22. Coupling capacitors 25 and 26 are connected to either end of dropping resistor 21, capacitor 25 coupling the anode of first detector diode 27 to the plate of tube 12, and capacitor 26 coupling the anode of second detector diode 28 to the intersection of resistor 21 and resonant circuit 22. The series combination of inductor 29 and resistor 30 couples the anode of diode 27 to the midpoint of a voltage divider 31 comprising resistors 32 and 33, while inductor 34 and resistor 35 couple the anode of diode 28 to the same point. The series resistor-inductor circuits serve to complete a circuit about each diode, passing lower frequency signals applied thereto but preventing the passage of IF signals.

Filtering means comprised of capacitors 36, 37 and 64 and inductors 38 and 39 are coupled to the cathode of first detector diode 27 for applying a filtered, detected signal to subsequent circuitry. Similarly, capacitors 40, 41 and 65 and inductors 42 and 43 perform the same function for second detector diode 28. Resistors 44 and 45 serve to couple the detected and filtered signals from the cathode terminals of detector diodes 27 and 28, respectively, to the midpoint of voltage divider 31. Capacitor 46 serves to shunt spurious high-frequency signals to ground.

A differential amplifier including a pair of transistors 47 and 48 is provided for receiving the signals detected by diodes 27 and 28. The base of transistor 47 is connected through one of the filtering networks to the cathode of diode 27, and has a biasing resistor 49 connected from the base terminal thereof to ground. Similarly, the base of transistor 48 is coupled to ground by means of biasing resistor 50, and through the other filtering network to the cathode of detector diode 28. The emitter terminals of transistors 47 and 48 are connected to a source of suitable biasing potential by resistors 51 and 52, which are preferably of a relatively high order of impedance to lend the characteristics of a constant-current source to the biasing circuit. A further resistor 53 of a lower order of impedance couples the emitters of transistor 47 and 48 together for achieving the desired differential operation. Resistors 54 and 55 couple the collector terminals of transistor 47 and 48, respectively, to ground while the output of the differential amplifier circuit is taken at the collector terminal of transistor 47.

A 4.5 attenuate MHz trap comprising capacitor 56, inductor 57 and resistor 58 is provided for blocking the 4.5 MHz intercarrier sound signal component of the output signal of the differential amplifier. The signal appearing across load resistor 59 thus contains only luminance and chrominance signals suitable for application to subsequent luminance and chrominance circuitry (not shown). The signal outputted by the differential amplifier may also be coupled through resistor 60 and coupling capacitor 61 to the audio stage of the receiver (also not shown). A 4.5 MHz bandpass filter comprising capacitor 62 and inductor 63 serves to attentuate luminance and chrominance signals to facilitate the reproduction of the audio signal. an The operation of the system will now be described, with reference to FIG. 2 of the drawings. An IF signal derived from a tuner, or from preceding IF stages, is applied to a final IF amplification stage comprising vacuum tube 12. In the absence of carrier-enhancement circuitry the output of tube 12 appearing at the plate thereof would constitute a standard IF signal, the components of which would then have the normal relative amplitudes seen in the usual IF pass bands. Resonant circuit 22, comprising inductor 23 and capacitor 24, is coupled between the plate of tube 12 and ground by the series combination of dropping resistor 12 and capacitor 19. According to the teaching of R.B. B. Dome in copending application Ser. No. 112,136 resonant circuit 22 is tuned to 45.75 MHz, the frequency of the picture carrier component of the IF signal. As taught in the above-cited Dome application, by emphasizing or increasing the amplitude of the picture carrier with respect to the chrominance and sound carriers picture disturbances resulting from the heterodyning of these frequencies with the picture frequency, or the sidebands thereof, are substantially eliminated. The sound carrier may be applied to a common detector along with chrominance and picture information, without the need for removing the sound carrier by means of a 41.25 MHz trap and providing a separate detector for deriving a sound signal. It will be recognized by those skilled in the art that, due to the distortion of the IF signal effected by the presence of resonant circuit 22, the signal emanating from the detector will also be distorted.

One way of compensating for the after-detection distortion is to devise a compensating transfer circuit or amplifier system which operates upon the detected signal to correct or mitigate the distortion. The characteristics of such a device must be held within very close tolerances since it must compensate exactly for the distortion introduced into the IF signal by prior circuitry. The compensating device must therefore match the carrier-emphasis circuitry almost perfectly in order to provide the necessary correction to the detected signal. The present invention, on the other hand, does not attempt to impose modifications upon the detected signal which reflect the characteristics of a "correcting stage" but instead abstracts the distorted portion and subtracts the detected envelope thereof from the entire detected signal. The difference signal thus derived represents the desired signal configuration, the demodulated product of an undistorted IF signal.

To this end, second detector means are provided to detect only the emphasized-carrier portion of the IF signal. The second detector is constituted by diode 28 which is coupled by means of capacitor 26 to the junction between resistor 21 and resonant circuit 22. The signals impressed upon detector diode 28 reflect only the voltage drop across resonant circuit 22 effected by the picture carrier. This voltage, however, is substantially that which constitutes the distortion or "enhancement"of the picture carrier. It will thus be seen that while diode 27 serves to detect a full range of the emphasized-carrier IF signal, diode 28 detects a signal corresponding only to the emphasized or nonattenuated portion thereof. After detection and suitable filtering by subsequent L-C networks, the detected signals appear as voltages developed across resistors 44 and 45. Current transmitted by first detector diode 27 impinges upon the base terminal of transistor 47, causing the transistor to operate in a manner which reflects the characteristics of the detected signal at its base. Similarly, the detected signal outputted by second detector diode 28 appears as a signal at the base terminal of transistor 48 and modulates the conductivity thereof. Low-impedance resistor 53 shunts current toward whichever of transistors 47, 48 exhibits the higher transconductance at a given instant. The voltage drop across the resistor which couples the collector of each transistor to ground is then a function of both the signal applied to the base terminal, the transistor, and the state of the opposite transistor. Transistors 47 and 48 thus act in a manner well known to those skilled in the art to provide a differential output which appears as a voltage across resistor 54. This output is, in essence, the differential amplitude between the detected emphasized-carrier signal provided by detector 27, and the detected emphasizing or distorting signal derived by diode 28. The differential amplifier thus acts to cancel out the distortion effected by the carrier-emphasizing circuitry, without the need for compensating means having specially-tailored characteristics. The signal produced by the differential amplifier contains the necessary sound, chroma and picture signals for reproducing both the sound and the image in a color television receiver.

In the embodiment disclosed, it has been found advantageous to split the output of the differential amplifier, applying one portion portion thereof to a 4.5 MHz trap for eliminating the sound intercarrier signal and transferring the remaining detected signal to suitable luminance and chrominance circuitry (not shown). Such a suitable 4.5 MHz trap is constituted by center-tapped inductor 57, capacitor 56 and resistor 58. The other portion of the split output is applied by means of a 4.5 MHz bandpass filter, comprising capacitor 62 and inductor 63, to suitable sound signal processing circuitry (not shown).

The advantages of the disclosed system are now apparent. Although, in contradistinction to the copending Dome application, a pair of detectors are necessary to carry out the operation of the present invention, the system nonetheless allows the elimination of the expensive 41.25 MHz trap which is ordinarily necessary to prevent the introduction of the sound carrier into the detection circuit. Instead, the sound carrier is processed along with the rest of the IF signal, and compensation for the emphasized carrier effect on the IF signal is carried out by means of relatively straightforward differential amplifier. The components of the amplifier and the values of the circuitry associated therewith need not be held to precise tolerances as in the case of a unilaterally compensating circuit, since a self-cancelling action is provided. Further, the tuning of the receiver need not be as precise as that needed when a single detector and associated compensating circuit is used. The present circuit thus embodies most of the advantages of the Dome teaching with the further advantages of lessened sensitivity to improper tuning, and less criticality of component values.

While it will be understood that the values of various circuit components may be varied to suit a particular application, the following values of circuit components are given by way of example:

| | | |
|---|---|---|
| Resistors: | **14** | 100ohms |
| | **18** | 470 " |
| | **21** | 100 " |
| | **30** | 47 " |
| | **32** | 6800 " |
| | **33** | 4700 " |
| | **35** | 47 " |
| | **44** | 3900 " |
| | **45** | 3900 " |
| | **49** | 220Kilohms |
| " | **50** | 220 |
| | **51** | 1000ohms |
| | **52** | 1000 " |
| | **53** | 100 " |
| | **54** | 2200 " |
| | **55** | 270 " |
| | **58** | 2200 " |
| | **59** | 360 " |
| | **60** | 360 " |
| Tube | **12** | 6JC6 |
| Capacitors: | **15** | 680picofarads |
| | **19** | 1500 " |
| | **24** | 120 " |
| | **25** | 800 " |
| | **26** | 800 " |
| | **36** | 6 " |
| | **37** | 4 " |
| | **40** | 6 " |
| | **41** | 4 " |
| | **46** | 1800picofarads |
| | **56** | 270 " |
| | **61** | 15 " |
| | **62** | 150 " |
| | **64** | 10 " |
| | **65** | 10 " |
| Inductors: | **20** | 1.8microhenrys |
| | **23** | .07-.14 " |
| | **29** | 5.6 " |
| | **35** | 5.6 " |
| | **38** | 1.8 " |
| | **39** | 36 " |
| | **42** | 1.8 " |
| | **43** | 36 " |
| | **57** | 2.7-7.4 " |
| | **63** | 3.9-10.5 " |
| Diodes: | **27** | IN87A |
| | **28** | " |
| Transistors: | **47** | MPS6518 (Motorola) |
| | **48** | " " |

As will be evident from the foregoing description, certain aspects of the invention are not limited to the particular details of construction of the examples illustrated, and it is therefore contemplated that other modifications or applications will occur to those skilled in the art. It may be advantageous, for instance, to substitute for the biasing resistors 51 and 52 shown in conjunction with a D.C. voltage bias source, a constant-current source such as a transistor having a constant bias applied to the base.

Similarly, it may be found desirable to substitute solid state IF amplification means for the vacuum tube 12 shown in FIG. 2. Still further, it will be recognized that means other than resonant circuit 22 may be used for the selective attenuation of portions of the IF signal, in order to achieve the desired emphasized carrier configuration. These considerations are regarded as ancillary to the present invention, and it is intended that the appended claims shall cover all such modifications and applications as do not depart from the true spirit and scope of the invention.

What is claimed as new and desired to be secured by Letters Patent of the United States is:

1. In a television receiver including means for deriving an IF signal:

first detector means having an input and an output terminal, said input terminal being adapted to receive the IF signal;

signal emphasizing means for causing the amPlitude of predetermined portions of the IF signal to increase relative to the amplitudes of other portions of the IF signal;

second detector means having an input terminal and an output terminal, said input terminal being adapted to be coupled to said signal emphasizing means;

means coupling said input terminals of said first and second detector means; and differential circuit means adapted to receive signals produced at the output terminals of said first and said second detector means for producing an output corresponding to the difference in amplitude between said signals.

2. In a television receiver including means for deriving an IF signal including a sound carrier portion, a chroma carrier portion, and a picture carrier portion;

first detector means adapted to receive the IF signal;

resonant circuit means for causing the amplitude of the picture carrier portion of the IF signal to increase relative to the amplitudes of the other portions of the IF signal;

second detector means adapted to be coupled across said resonant circuit means;

means for coupling said resonant circuit means to said first detector means for supporting a voltage drop thereacross which includes said other portions of said IF signal; and differential amplifier means adapted to receive signals derived by said first and said second detector means for outputting a signal representative of the difference therebetween.

3. The invention as defined in claim 2, wherein said resonant circuit means comprises the parallel combination of an inductor and a capacitor.

4. The invention as defined in claim 3, further including first circuit means adapted to receive the signal outputted by said differential amplifier means for attenuating the signals outputted thereby which constitute sound information but not substantially attenuating others of said signals; and second circuit means adapted to receive the signal outputted by said differential amplifier means for passing portions of said signal representing sound information and attenuating the other portions of said signal.

5. In a television receiver including means for deriving an IF signal including a sound carrier, a chroma carrier and a picture carrier:

signal emphasizing means adapted to be coupled to the path of the IF signal, said signal emphasizing means comprising the series combination of resistive means having a first and a second end and resonant circuit means coupled to said second end of said resistive means;

first detector means for detecting signals appearing at said first end of said resistive means;

second detector means for detecting signals appearing at said second end of said resistive means; and differential amplifier means adapted to receive signals outputted by said first and said second detector means for providing a signal representative of the difference therebetween.

6. The invention as defined in claim 5, further including inductive means coupled across said signal emphasizing means.

7. The invention as defined in claim 6, wherein said first and second detector means are diodes.

8. The invention as defined in claim 7, further including filter means coupled between said detector means and said differential amplifier means.

9. The invention as defined in claim 7 wherein said differential amplifier means comprises at least two electronic devices, each of said electronic devices having an input and an output terminal and a control terminal.

10. The invention as defined in claim 8, further including second filter means adapted to receive the signal outputted by said differential amplifier means for substantially blocking those portions of said signal representing sound signals and passing substantially the rest of said signal.

11. The invention as defined in claim 9, further including third filter means adapted to receive the signal outputted by said differential amplifier means for passing those portions of said signal representing sound signals and substantially blocking the rest of said signal

* * * * *